(12) United States Patent
Forutanpour (10) Patent No.: US 8,971,659 B2
(45) Date of Patent: Mar. 3, 2015

(54) BAD PIXEL CLUSTER DETECTION

(75) Inventor: Babak Forutanpour, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1635 days.

(21) Appl. No.: 12/185,875

(22) Filed: Aug. 5, 2008

(65) Prior Publication Data

US 2010/0034481 A1  Feb. 11, 2010

(51) Int. Cl.
| | |
|---|---|
| G06K 9/40 | (2006.01) |
| G06K 9/62 | (2006.01) |
| G06K 9/38 | (2006.01) |
| H04N 5/367 | (2011.01) |
| H04N 5/217 | (2011.01) |

(52) U.S. Cl.
CPC ............ *H04N 5/367* (2013.01); *H04N 5/3675* (2013.01)
USPC ........... 382/275; 382/225; 382/260; 382/270; 382/274; 348/241; 348/243; 348/246; 348/247

(58) Field of Classification Search
USPC .......... 382/254, 260, 270, 275; 348/246, 615
See application file for complete search history.

(56) References Cited

U.S. PATENT DOCUMENTS

| | | | |
|---|---|---|---|
| 6,965,395 B1 | 11/2005 | Neter | |
| 6,985,180 B2 | 1/2006 | Chang et al. | |
| 7,667,747 B2 * | 2/2010 | Hung et al. | 348/246 |
| 7,920,751 B2 * | 4/2011 | Li et al. | 382/254 |
| 2002/0196354 A1 * | 12/2002 | Chang et al. | 348/246 |
| 2004/0061785 A1 | 4/2004 | Aufrichtig et al. | |
| 2004/0096125 A1 | 5/2004 | Alderson et al. | |
| 2004/0239782 A1 | 12/2004 | Equitz et al. | |
| 2005/0286797 A1 | 12/2005 | Hayaishi | |
| 2006/0044425 A1 | 3/2006 | Yeung et al. | |
| 2006/0215902 A1 | 9/2006 | Shibuya et al. | |
| 2006/0215920 A1 | 9/2006 | Yokose | |
| 2007/0058848 A1 | 3/2007 | Heike et al. | |
| 2007/0165118 A1 | 7/2007 | Forutanpour | |
| 2007/0216786 A1 * | 9/2007 | Hung et al. | 348/246 |
| 2008/0152230 A1 | 6/2008 | Forutanpour | |

FOREIGN PATENT DOCUMENTS

| | | |
|---|---|---|
| EP | 1343311 | 9/2003 |
| EP | 1605403 | 12/2005 |
| JP | 2004023683 A | 1/2004 |
| JP | 2004320128 A | 11/2004 |
| JP | 2005223796 A | 8/2005 |

(Continued)

OTHER PUBLICATIONS

International Search Report and Written Opinion—PCT/US09/052760, International Search Authority—European Patent Office—Feb. 10, 2010.

*Primary Examiner* — Matthew Bella
*Assistant Examiner* — Jose M Torres
(74) *Attorney, Agent, or Firm* — James R. Gamble, Jr.

(57) ABSTRACT

Systems and methods of bad pixel cluster detection are disclosed. In a particular embodiment, a system is disclosed that includes a bad pixel correction module coupled to receive image data and adapted to perform a bad pixel cluster detection process. The bad pixel correction module includes logic to determine whether two test pixels have values that exceed a representative value of a group of surrounding pixels by more than a threshold amount. The threshold amount is determined via a table lookup.

30 Claims, 8 Drawing Sheets

(56) References Cited

FOREIGN PATENT DOCUMENTS

| JP | 2005354278 A | 12/2005 |
| JP | 2006217113 A | 8/2006 |
| JP | 2007053659 A | 3/2007 |
| JP | 2008148115 A | 6/2008 |
| WO | WO2007106898 | 9/2007 |

* cited by examiner

BAD PIXEL CLUSTER DETECTION

FIELD

The present disclosure is generally related to bad pixel cluster detection.

DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Digital signal processors (DSPs), image processors, and other processing devices are frequently used in portable personal computing devices that include digital cameras, or that display image or video data captured by a digital camera. Such processing devices can be utilized to provide video and audio functions, to process received data such as image data, or to perform other functions.

Image data may include single pixels or clusters of pixels that have incorrect values that may result from one or more malfunctioning cells of an image array, from dust, from a scratch or other aberration on the camera lens, or due to other causes. Such bad pixels or defective pixels may be detected and corrected to improve a quality of the displayed image. However, accurate detection and correction of bad pixel clusters in a portable computing device may be limited by available processing resources.

SUMMARY

In a particular embodiment, a system is disclosed that includes a bad pixel correction module coupled to receive image data and adapted to perform a bad pixel cluster detection process. The bad pixel correction module includes logic to determine whether two test pixels have values that exceed a representative value of a group of surrounding pixels by more than a threshold amount. The threshold amount is determined via a table lookup.

In another particular embodiment, a system is disclosed that includes a signal processor adapted to detect bad pixel clusters in image data by determining when a first test pixel and a second test pixel have values above an upper limit or below a lower limit. The upper limit and the lower limit are determined based on pixel values of a group of at least eight pixels surrounding the first test pixel and the second test pixel. The signal processor is further adapted to generate processed image data having modified pixel values corresponding to the detected bad pixel clusters. The system also includes a display controller coupled to receive the processed image data and to provide the processed image data to a display device.

In another particular embodiment, a method is disclosed. The method includes receiving image data and selecting a first test pixel of the image data. The first test pixel has a first test pixel value. The method also includes selecting a second test pixel of the image data. The second test pixel has a second test pixel value and the second test pixel is adjacent or diagonal to the first test pixel. The method further includes determining whether the first test pixel and the second test pixel form a bad pixel cluster based on evaluating a group of surrounding pixels. Each pixel of the group of surrounding pixels is a nearest neighbor to the first test pixel or the second test pixel. At least a first pixel of the group of surrounding pixels is not a nearest neighbor to the first test pixel, and at least a second pixel of the group of surrounding pixels is not a nearest neighbor to the second pixel.

In another particular embodiment, the method includes receiving image data and selecting a first test pixel of the image data, where the first test pixel has a first test pixel value. The method also includes testing the first test pixel to determine whether the first test pixel is part of a bad pixel cluster based on at least a first group of surrounding pixels that includes nearest neighbor pixels of the first test pixel. After the first test pixel is evaluated based on the first group of surrounding pixels, the method includes determining whether the first test pixel is a bad pixel based on pixel values of an extended group of pixels. The extended group of pixels includes at least some of the nearest neighbor pixels and further includes pixels that are not nearest neighbors to the first test pixel.

One particular advantage provided by embodiments of the bad pixel cluster detection method is efficient detection of bad pixels and bad pixel clusters using a relatively small number of processing steps that can be performed at a portable computing device.

Other aspects, advantages, and features of the present disclosure will become apparent after review of the entire application, including the following sections: Brief Description of the Drawings, Detailed Description, and the Claims.

DETAILED DESCRIPTION

Figure 1:
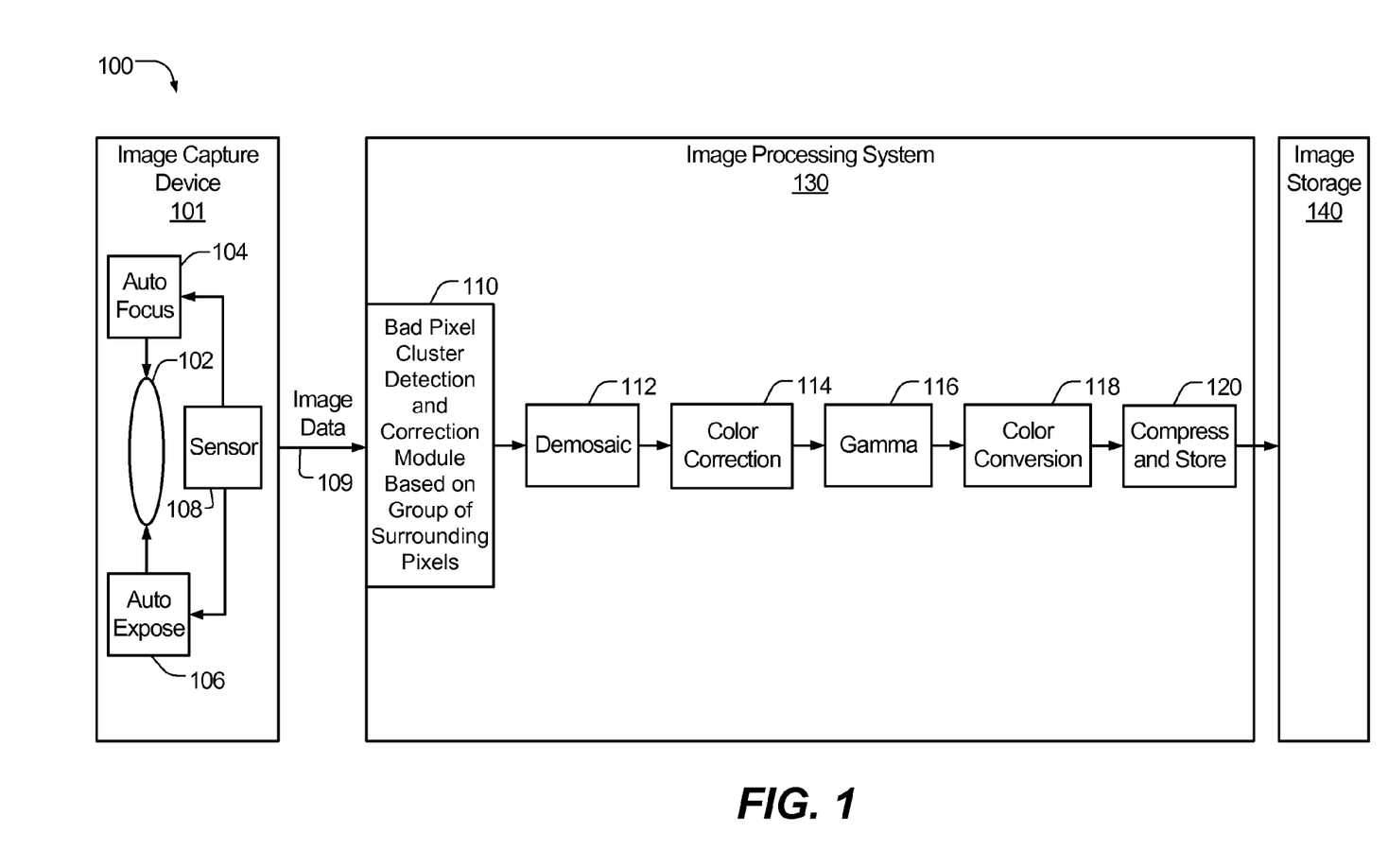
FIG. 1 is a block diagram of a particular illustrative embodiment of a system including an image processing system having a bad pixel cluster detection module.

FIG. 1 is a block diagram of a particular illustrative embodiment of a system including an image processing system having a bad pixel cluster detection and correction module. The system 100 includes an image capture device 101 coupled to an image processing system 130. The image processing system 130 is coupled to an image storage device 140.

The image processing system 130 is configured to receive image data 109 from the image capture device 101 and to detect and correct bad pixel clusters of the image data 109 based on a group of surrounding pixels. Generally, the system 100 may be implemented in a portable electronic device that is configured to perform real-time image processing using relatively limited processing resources.

In a particular embodiment, the image capture device 101 is a camera, such as a video camera or a still camera. The image capture device 101 includes a lens 102 that is responsive to a focusing module 104 and to an exposure module 106. A sensor 108 is coupled to receive light via the lens 102 and to generate the image data 109 in response to an image received via the lens 102. The focusing module 104 may be responsive to the sensor 108 and may be adapted to automatically control focusing of the lens 102. The exposure module 106 may also be responsive to the sensor 108 and may be adapted to control an exposure of the image. In a particular embodiment, the sensor 108 includes multiple detectors, or pixel wells, that are arranged so that adjacent detectors detect different colors of light. For example, received light may be filtered so that each detector receives red, green, or blue incoming light.

The image capture device 101 is coupled to provide the image data 109 to the image processing system 130. The image processing system 130 includes a bad pixel cluster detection and correction module 110 that is configured to detect bad pixel clusters based a group of surrounding pixels, as is discussed with respect to FIGS. 2-8. The image processing system 130 also includes a demosaic module 112 to perform a demosaic operation on processed imaged data received from the bad pixel cluster detection and correction module 110. A color correction module 114 is configured to perform a color correction on demosaiced image data. A gamma module 116 is configured to generate gamma corrected data from data received from the color correction module 114. A color conversion module 118 is coupled to perform a color space conversion to the gamma corrected image data. A compress and store module 120 is coupled to receive an output of the color conversion module 118 and to store compressed output data to the image storage device 140. The image storage device 140 may include any type of storage medium, such as one or more display buffers, registers, caches, flash memory elements, hard disks, any other storage device, or any combination thereof.

During operation, the bad pixel cluster detection and correction module 110 may detect and correct bad pixel clusters of the input image data 109. For example, bad pixel clusters may be caused by increased or reduced pixel sensitivity, by current leakage into the pixel wells of the sensor 108, by dust particles between the lens 102 and the sensor 108, or other causes. Detecting bad pixel clusters based on one or more groups of surrounding pixels of the input image data 109 enables efficient image processing with accurate bad pixel cluster detection.

Figure 2:
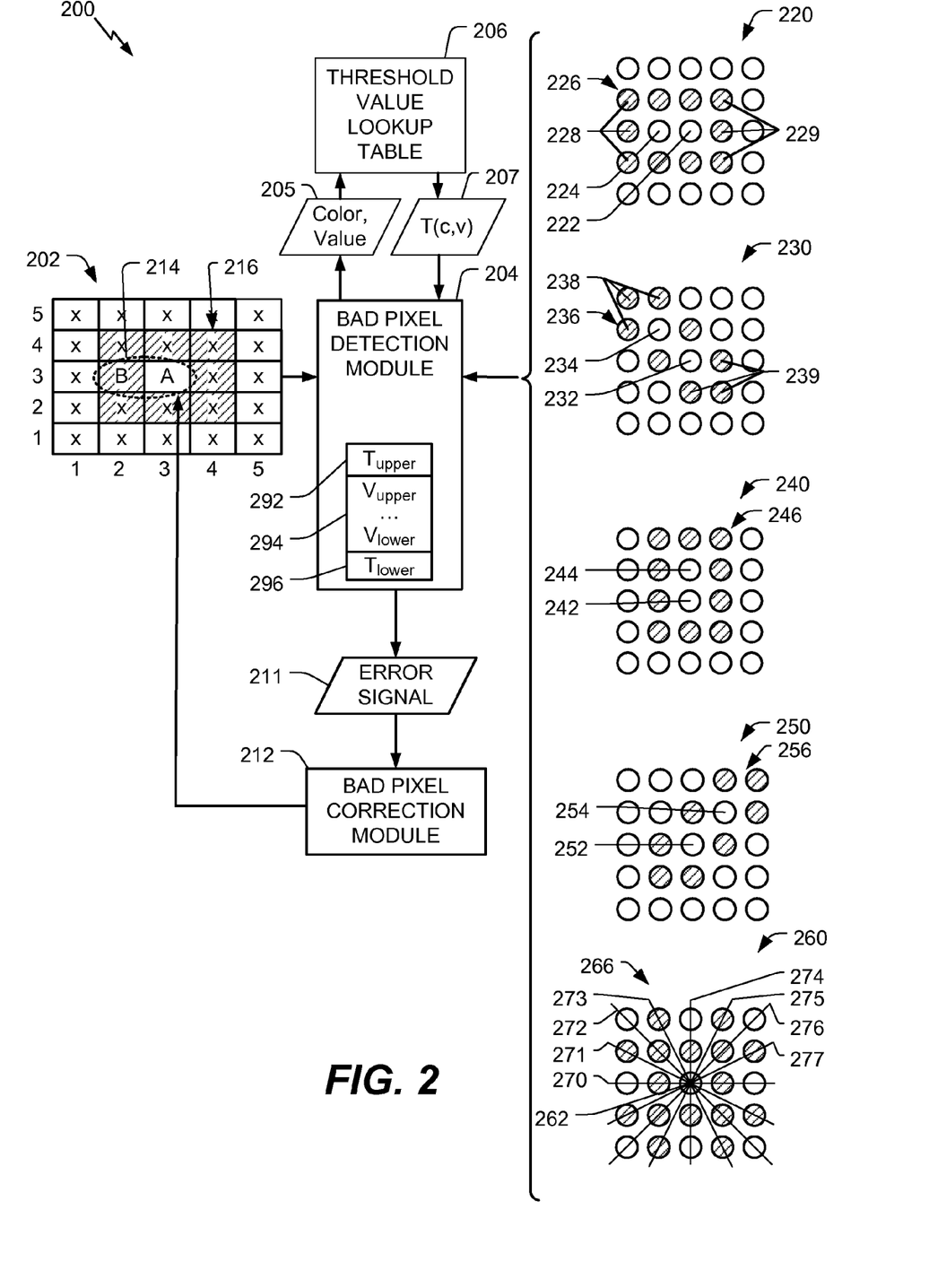
FIG. 2 is a data flow diagram of a first illustrative embodiment of a system to detect bad pixel clusters.

FIG. 2 is a data flow diagram of a first illustrative embodiment of a system to detect bad pixel clusters. In a particular embodiment, the system 200 may be implemented in the bad pixel cluster detection and correction module 110 of FIG. 1. Image data 202 is provided to bad pixel detection module 204. A threshold value lookup table 206 is also accessible to the bad pixel detection module 204. Based on comparisons of a particular pixel with one or more groups of surrounding pixels, such as according to a first pattern 220, a second pattern 230, a third pattern 240, a fourth pattern 250, or a fifth pattern 260, the bad pixel detection module 204 may determine that the particular pixel is an isolated bad pixel or part of a bad pixel cluster, and may generate an error signal 211. The error signal 211 may be provided to a bad pixel correction module 212.

The image data 202 is illustrated as including pixel data aligned in rows and columns having index values of 1-5. The image data 202 may represent a portion of a larger image that is being processed for bad pixel detection. A center pixel at (row, column)=(3,3) has eight nearest neighbors 216 illustrated as the eight shaded pixels adjacent to the center pixel vertically, horizontally, and diagonally. All pixels of the image data 202 are labeled "x" except for the center pixel labeled "A" and the pixel at (3,2) labeled "B" which form a cluster 214. In a first embodiment, the pixels labeled "A" and "B" each have a pixel value that is less than the minimum value of the pixels labeled "x," and the cluster 214 may be referred to as a cold cluster. In another embodiment, the pixels labeled "A" and "B" each have a pixel value that is greater than the maximum value of the pixels labeled "x," and the cluster 214 may be referred to as a hot cluster.

In a particular embodiment, the value of each pixel of the image data 202 indicates a brightness or intensity level of the pixel. For example, each pixel may represent light received at a corresponding detector cell of an image sensor. The intensity of the pixel may indicate a relative amount of light received at the corresponding detector cell as a numerical value. Pixel intensity may be represented as a number, such as in a range of zero to two hundred fifty-five, with zero indicating no light at the pixel location, and two hundred fifty-five representing a largest amount of light at the pixel location. In addition, in a particular embodiment, pixel intensity values are associated with a corresponding state or color channel, such as a red, green, or blue color channel. However, in other embodiments, pixel values may not indicate intensity levels associated with color channels, and may instead indicate other pixel data such as hue, saturation, and value (HSV) data.

In a particular embodiment, the patterns 220, 230, 240, and 250 indicate groups of surrounding pixels, illustrated as shaded circles, to compare to a pixel under test, such as the pixel labeled "A" of the image data 202. For example, the first pattern 220 includes a first test pixel 222, a second test pixel 224 adjacent to the first test pixel 222, and a first group of surrounding pixels 226. The first group of surrounding pixels 226 includes ten pixels that form a rectangular pattern around the first test pixel 222 and the second test pixel 224. The second pattern 230 includes a first test pixel 232, a second test pixel 234 diagonal to the first test pixel 232, and a second group of surrounding pixels 236. The second group of surrounding pixels 236 includes eight pixels that form an irregular hexagonal pattern around the first test pixel 232 and the second test pixel 234. The third pattern 240 includes a first test pixel 242, a second test pixel 244 adjacent to the first test pixel 242, and a third group of surrounding pixels 246. The fourth pattern 250 includes a first test pixel 252, a second test pixel 254 diagonal to the first test pixel 252, and a fourth group of surrounding pixels 256.

Each pixel of each group of surrounding pixels 226, 236, 246, and 256 is a nearest neighbor to at least one of the first test pixel 222, 232, 242, or 252, respectively, or the second test pixel 224, 234, 244, or 254, respectively. In addition, at least a first pixel of each group of surrounding pixels 226, 236, 246, and 256 is not a nearest neighbor to the first test pixel 222, 232, 242, or 252, respectively, and at least a second pixel of the group of surrounding pixels is not a nearest neighbor to the second test pixel 224, 234, 244, or 254, respectively. For example, the first group of surrounding pixels 226 includes three pixels 228 that are nearest neighbors to the second test pixel 224 and not nearest neighbors to the first test pixel 222.

The first group of surrounding pixels 226 also includes three pixels 229 that are nearest neighbors to the first test pixel 222 and not nearest neighbors to the second test pixel 224. As another example, the second group of surrounding pixels 236 includes three pixels 238 that are nearest neighbors to the second test pixel 234 not nearest neighbors to the first test pixel 232. The second group of surrounding pixels 236 also includes three pixels 239 that are nearest neighbors to the first test pixel 232 and not nearest neighbors to the second test pixel 234.

The bad pixel detection module 204 is configured to use the first pattern 220 to determine whether pixels in the image data 202 corresponding to the first test pixel 222 and the second test pixel 224 form a bad pixel cluster, or a "double bad" cluster, by comparing values of the test pixels 222 and 224 to values of pixels in the first group of surrounding pixel locations 226. Similarly, the bad pixel detection module 204 is configured to use the second pattern 230 to determine whether the first test pixel 232 and the second test pixel 234 form a bad pixel cluster in the image data 202 by comparing values of the pixels 232 and 234 to values of pixels of the second group of surrounding pixels 236. The bad pixel detection module 204 is also configured to use the third pattern 240 to determine whether the first test pixel 242 and the second test pixel 244 form a bad pixel cluster in the image data 202 by comparing values of the pixels 242 and 244 to values of pixels of the third group of surrounding pixels 246. The bad pixel detection module 204 is further configured to use the fourth pattern 250 to determine whether the first test pixel 252 and the second test pixel 254 form a bad pixel cluster in the image data 202 by comparing values of the pixels 252 and 254 to values of pixels of the fourth group of surrounding pixels 256.

In addition, the fifth pattern 260 may be used by the bad pixel detection module 204 to select a group of pixels 266 to compare to a pixel under test, such as the pixel labeled "A" of the image data 202, to determine whether the pixel under test is an isolated bad, or "single bad," pixel. The bad pixel detection module 204 may determine whether a first test pixel 262 is a bad pixel based on pixel values of an extended group of pixels 266 that is different from the group of surrounding pixels 220, 230, 240, or 250. The bad pixel detection module 204 may compare the first test pixel value to values of each pixel nearest to the first test pixel 262 along sixteen evenly spaced directions radially outward from the first test pixel 262 to determine whether the first test pixel 262 is a bad pixel. The extended group of pixels 266 includes pixels that are nearest neighbors to the first test pixel and at least two pixels that are not nearest neighbors to the first test pixel 262. For example, the extended group of pixels 266 includes each pixel that is nearest to the first test pixel 262 along eight substantially evenly spaced lines 270-277 that intersect at the first test pixel 262. The pixels in the group of extended pixels 266 along the lines 270, 272, 274, and 276 are nearest neighbors to the first test pixel 262, while the pixels along the lines 271, 273, 275, and 277 are not nearest neighbors to the first test pixel 262.

Based on the error signal 211, the bad pixel correction module 212 may be configured to modify the values of the pixels of a bad pixel cluster or the value of an individual bad pixel. For example, when the cluster 214 is identified as a bad pixel cluster, the bad pixel cluster correction module 212 may set the value of each pixel of the cluster 214 to the largest value of the group of surrounding pixels 226, 236, 246, 256, or 266 for a hot cluster, or to the smallest value for a cold cluster. As other examples, largest or smallest values, median values, average values, or any other representative values based on surrounding pixels may be used to replace or determine the values of the cluster 214.

During operation, the system 200 may perform a bad pixel cluster detection process on image data that is captured by an image sensor, retrieved from a memory, or received via a wireless or wireline transmission. The system 200 may traverse the image data pixel-by-pixel and, at each particular pixel, evaluate values of surrounding pixels of the image data corresponding to the groups of pixels 226, 236, 246, 256, and 266 centered at the particular pixel to detect double bad and single bad pixels. The system 200 may perform a first pass to detect hot pixel clusters and a second pass to detect cold pixel clusters, or alternatively may perform the detection process for both hot clusters and cold clusters in a single pass through the image data.

For each selected pixel, the bad pixel detection module 204 may determine whether the selected pixel is part of a bad pixel cluster by evaluating neighboring pixel values as represented in the patterns 220, 230, 240, and 250. Using the first pattern 220 to illustrate, the bad pixel detection module 204 may determine values of the pixels in the image data 202 corresponding to the first test pixel 222 and the second test pixel 224 of the first pattern 220. The pixel "A" in the image data 202 corresponding to the first test pixel 222 has a value "$V_A$" and the pixel "B" in the image data 202 corresponding to the second test pixel 224 has a value "$V_B$." The bad pixel detection module 204 may compare the values $V_A$ or $V_B$ to one or more representative values from the neighboring pixels, such as a largest neighboring pixel value, a smallest neighboring pixel value, a second-largest or second-smallest neighboring pixel value, a median value, a mean value, or any other representative value.

In an illustrative embodiment, the bad pixel detection module 204 determines values of pixels in the image data 202 corresponding to the first group of surrounding pixels 226 and generates an ordered set of surrounding values 294 from a largest value $V_{upper}$ of the first group of surrounding pixels 226 to a smallest value $V_{lower}$ of the first group of surrounding pixels 226. The bad pixel detection module 204 may compare the lower value $V_A$ or $V_B$ of the test pixels 222 and 224 to $V_{upper}$. When the lesser value $V_A$ or $V_B$ of the test pixels 222 and 224 is greater than $V_{upper}$ by an amount greater than an upper threshold $T_{upper}$ 292, the test pixels 222 and 224 are determined to be a hot cluster. Similarly, the bad pixel detection module 204 may compare the greater value $V_A$ or $V_B$ of the test pixels 222 and 224 to $V_{lower}$. When the greater value $V_A$ or $V_B$ of the test pixels 222 and 224 is less than $V_{lower}$ by an amount greater than a lower threshold $T_{lower}$ 296, the test pixels 222 and 224 are determined to be a cold cluster. If the test pixels 222 and 224 are not determined to be part of a bad pixel cluster, the bad pixel detection module 204 may repeat the comparison process for each of the patterns 230, 240, and 250.

In a particular embodiment, the upper threshold $T_{upper}$ 292, the lower threshold $T_{lower}$ 296, or both, may be determined by performing one or more lookup operations at the threshold value lookup table 206. The threshold value lookup table 206 may store data corresponding to threshold values as a function of color channel, intensity value, or both. The bad pixel detection module 204 may use pixel data 205, such as color channel and intensity value for one or more of the test pixels, to perform a lookup operation at the threshold value lookup table 206 that returns a threshold amount 207 that is determined based on a color channel and an intensity of one or more test pixels. For example, the threshold amount 207 may correlate to an ability of a typical observer to perceive variations in color intensity as a function of the color, the intensity, or both. In a particular embodiment, the threshold amount 207 corresponding to the larger value of the first test pixel 222 and the second test pixel 224 may be used as the lower threshold $T_{lower}$ 296, while the threshold amount 207 corresponding to the smaller value of the first test pixel 222 and the second test pixel 224 may be used as the upper threshold $T_{upper}$ 292. Illustrative examples of threshold values that may be stored in the threshold value lookup table 206 based on human perception of intensity and color are depicted in Tables 1-3. Although illustrated in three tables (Tables 1-3), the threshold values may be stored at the threshold value lookup table 206 as a single table or set of data.

TABLE 1

Threshold values based on pixel intensity and color channel

| | Pixel Value (Hot Range) | | | | | | |
|---|---|---|---|---|---|---|---|
| | 190 | 200 | 210 | 220 | 230 | 240 | 250 |
| Red Threshold | 18 | 18 | 20 | 22 | 22 | 22 | 22 |
| Green Threshold | 18 | 18 | 18 | 20 | 20 | 20 | 20 |
| Blue Threshold | 32 | 32 | 32 | 32 | 32 | 34 | 34 |

TABLE 2

Threshold values based on pixel intensity and color channel

| | Pixel Value (Warm Range) | | | | | | | | | |
|---|---|---|---|---|---|---|---|---|---|---|
| | 90 | 100 | 110 | 120 | 130 | 140 | 150 | 160 | 170 | 180 |
| Red Threshold | 16 | 16 | 16 | 16 | 16 | 16 | 16 | 16 | 16 | 16 |
| Green Threshold | 12 | 12 | 12 | 12 | 12 | 12 | 12 | 12 | 16 | 16 |
| Blue Threshold | 32 | 30 | 30 | 30 | 30 | 30 | 30 | 30 | 32 | 32 |

TABLE 3

Threshold values based on pixel intensity and color channel

| | Pixel Value (Cold Range) | | | | | | | |
|---|---|---|---|---|---|---|---|---|
| | 10 | 20 | 30 | 40 | 50 | 60 | 70 | 80 |
| Red Threshold | 25 | 25 | 25 | 25 | 22 | 22 | 20 | 18 |
| Green Threshold | 25 | 25 | 20 | 20 | 20 | 18 | 16 | 16 |
| Blue Threshold | 35 | 35 | 35 | 35 | 35 | 32 | 32 | 32 |

In response to determining that test pixels, such as the first test pixel 222 and the second test pixel 224 form a bad pixel cluster, the bad pixel detection module 204 may generate the error signal 211. The bad pixel correction module 212 may respond to the error signal 211 by modifying test pixel values. For example, where the test pixels 222 and 224 are determined to form a bad pixel cluster, the bad pixel correction module 212 may change the value of the test pixels 222 and 224 to the largest value $V_{upper}$ of the first group of surrounding pixels 226 or to the smallest value $V_{lower}$ of the first group of surrounding pixels 226, based on whether the test pixels 222 and 224 form a hot cluster or a cold cluster. As another example, the bad pixel correction module 212 may change the value of the test pixels 222 and 224 to a value equal to the largest value $V_{upper}$ plus the upper threshold $T_{upper}$ 292, or to the smallest value $V_{lower}$ minus the lower threshold $T_{lower}$ 296, based on whether the test pixels 222 and 224 form a hot cluster or a cold cluster, as a substantially largest deviation from the group of the surrounding pixels that may be visually imperceptible or minimally perceptible.

When the first test pixel 222 and the second test pixel 224 are not determined to form a bad pixel cluster, the bad pixel detection module 204 may continue processing the particular pixel under test by applying a similar cluster detection analysis using the patterns 230, 240, and 250. If the particular pixel under test is determined to not form a bad pixel cluster after applying each of the patterns 220, 230, 240, or 250, the bad pixel detection module 204 may apply the fifth pattern 260 to determine whether the particular pixel is a single bad pixel based on pixel values of the extended group of pixels 266. For example, the bad pixel detection module 204 may initiate a lookup operation using the value of the first test pixel 222 and a color associated with the first test pixel 222 at the threshold value lookup table 206, retrieve a threshold value 207 from the threshold value lookup table 207 based on the color and based on the value of the first pixel 222, and use the threshold value 207 to compare the value of the first test pixel 222 to representative values of the extended group of pixels 266. Examples of representative values of the extended group of pixels 266 include a largest or second largest pixel value, a smallest or next smallest pixel value, an average value, a median value, or other representative values of the extended group of pixels 266.

In a particular embodiment, the bad pixel detection module 204 may store or cache the returned threshold values 207 corresponding to one or more pixels to reduce a frequency of table lookup operations. For example, each of the patterns 220, 230, 240, 250, and 260 may use threshold value corresponding to a particular pixel under test, such as the pixel "A" in the image data 202. Thus, a single lookup operation may be performed to determine a threshold value associated with the particular pixel under test, and the returned threshold value 207 for the pixel under test may be stored for use with each of the patterns 220, 230, 240, 250, and 260.

After processing has completed for the particular pixel under test, resulting in either a modification of a value of the particular pixel or a determination that the particular pixel is not part of a bad pixel cluster or a single bad pixel, the system 200 may advance to testing a next pixel in the image data 202. Because the system 200 may systematically scan the image data, such as from right-to-left and top-to-bottom (possibly excluding pixels at or near an edge), the four cluster patterns 220, 230, 240, and 250 applied to each particular pixel are sufficient to test for bad pixel clusters including all of the eight nearest neighbors 216 of the particular pixel. Specifically, for a particular pixel, cluster tests for the three nearest neighboring pixels on the previously scanned row, and one nearest neighbor on the same row as a particular pixel, may have been previously tested for bad clusters that include the particular pixel, and need not be repeated.

The system 200 therefore may determine whether a particular pixel is part of a bad cluster or a single bad pixel by comparing pixel values to groups of surrounding pixels 226, 236, 246, and 256 and an extended group of pixels 266, using only simple operations such as addition, subtraction, reads, table lookups, and comparisons. In a particular embodiment, the bad pixel detection module 204 may be configured to test a pixel of the image data 202 by applying all of the patterns 220, 230, 240, 250, and 260 using no more than approximately one hundred two total operations for each pixel under test. As a result, the system 200 can be implemented in portable devices or systems with limited processing resources to provide fast detection and correction of single and double bad pixel clusters in image data.

Figure 3:
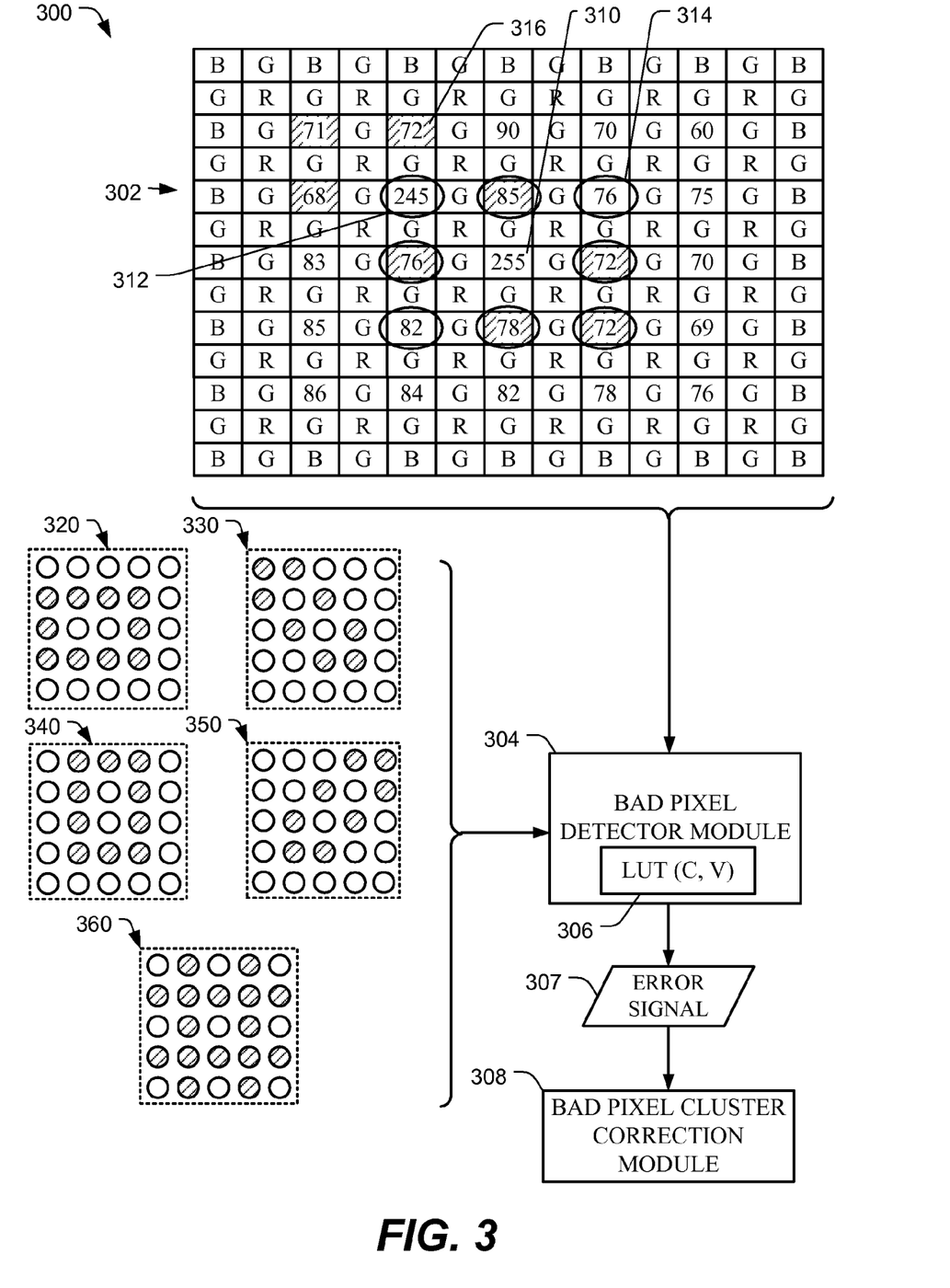
FIG. 3 is a data flow diagram of a second illustrative embodiment of a system to detect bad pixel clusters.

Referring to FIG. 3, a data flow diagram of a second illustrative embodiment of a system to detect bad pixel clusters is depicted and generally designated 300. In an illustrative embodiment, the system 300 may be implemented in the bad cluster detection and correction module 110 of FIG. 1 and may depict a specific embodiment of the system 200 of FIG. 2. The system 300 includes a bad pixel detection module 304 that receives input data 302 and applies patterns 320, 330, 340, 350, and 360 to detect bad pixel clusters and single bad pixels, and that provides an error signal 307 to a bad pixel cluster correction module 308. Each of the patterns 320-360 may represent a five-by-five sample of an image centered on a pixel 310.

The image data 302 is illustrated as a regular array of pixels arranged in rows and columns of pixels corresponding to alternating colors or color channels. The columns alternate between columns having green (G) and blue (B) pixels, and columns having red (R) and green (G) pixels, in a common Bayer mosaic configuration. The center pixel 310 is illustrated as a blue pixel having a value of 255, representing a maximum value of an illustrative range from 0-255. The center pixel 310 is part of a bad pixel cluster that also includes a nearest neighbor blue pixel 312 that has a value of 245, which is the largest value of the eight nearest neighbor pixels 314, illustrated as circled pixels. A group of surrounding blue pixels 316 is illustrated as shaded pixels surrounding the center pixel 310 and the pixel 312, respectively. As illustrated, the group of surrounding pixels 316 correspond to the pattern 330 applied to the blue channel of the image data 302 to test whether the center pixel 310 is part of a double bad pixel cluster.

In a particular embodiment, the bad pixel detector module 304 may be configured to determine whether a particular pixel of the image data 302 is part of a bad pixel cluster or a single bad pixel by applying each of the patterns 320, 330, 340, 350, and 360 to the image data 302 on a color-by-color basis. For example, where the center pixel 310 is blue, the bad pixel detector module 304 is configured to apply the patterns 320, 330, 340, 350, and 360 to only blue pixels neighboring the center pixel 310. In the illustrated embodiment, the bad pixel detector module 304 ignores non-blue pixels when applying the patterns 320, 330, 340, 350, and 360.

The bad pixel detector module 304 may include or have access to a lookup table 306 to determine threshold values based on a color channel and an intensity of one or more pixels under test as the patterns 320, 330, 340, 350, and 360 are applied. The lookup table 306 may store threshold values that are derived from human visual perception characteristics so that pixels having intensity values within the threshold amount of the pixel under test may be visually indistinguishable from the pixel under test, and thus not a bad pixel. For example, the lookup table 306 may store values illustrated in Table 1, Table 2, Table 3, or any combination thereof.

Similar operations can be performed for the red channel and the green channel of the image data 302. In other embodiments, the image data 302 may include other colors or mosaic patterns, such as other three-color mosaic configurations, four-color mosaic configurations, or other mosaic configurations, and the bad pixel detector module 304 may be configured to apply the patterns 320, 330, 340, 350, and 360 to pixels corresponding to individual color channels, such as described with respect to the blue color channel. In other embodiments, however, such as where the image data is not mosaic data, the system 300 may apply the patterns 320, 330, 340, 350, and 360 directly to the received image data without adjusting for color channels.

Figure 4:
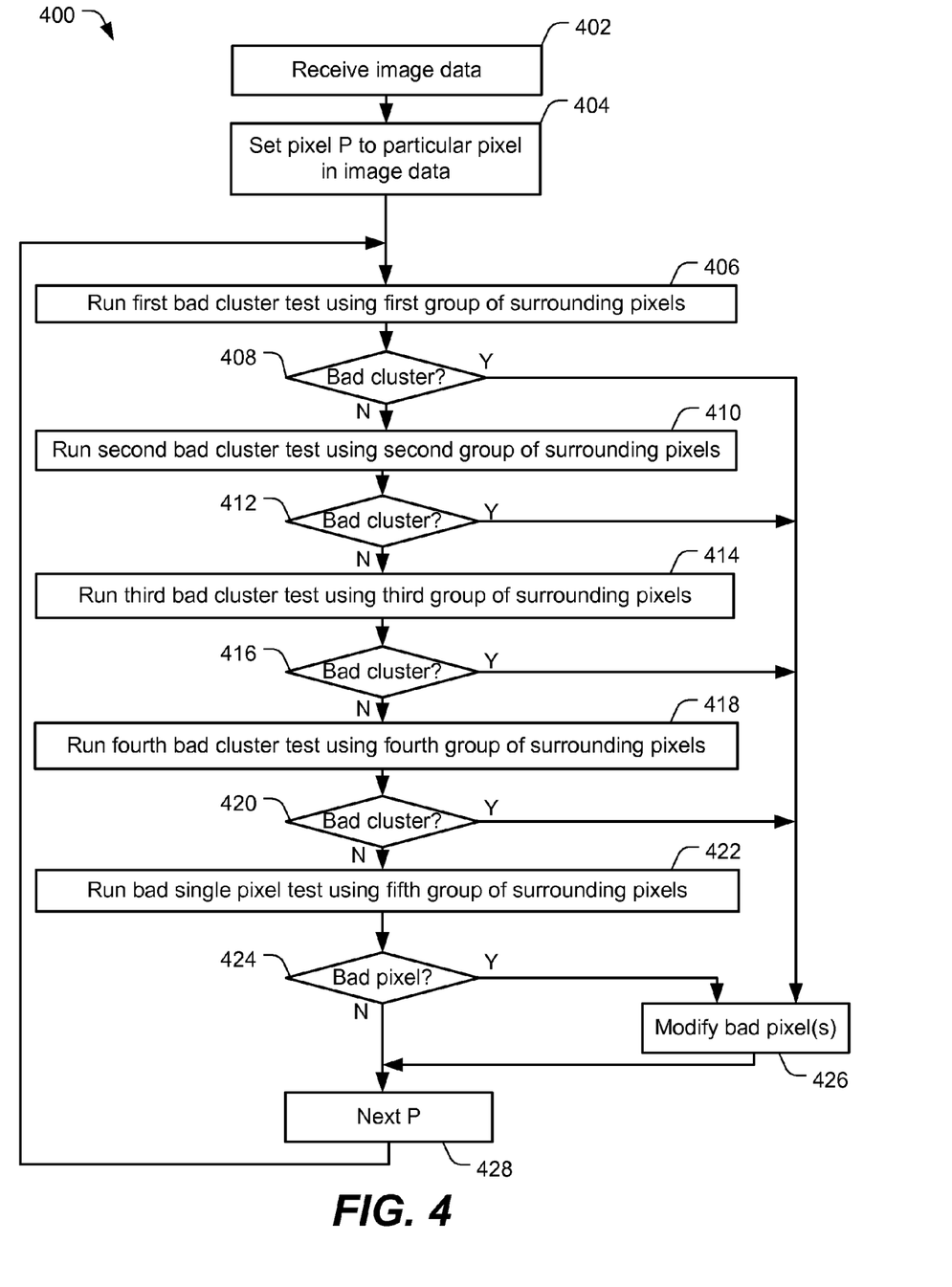
FIG. 4 is a flow chart of a first illustrative embodiment of a method of detecting bad pixel clusters.

FIG. 4 is a flow chart of a first illustrative embodiment of a method of detecting bad pixel clusters. In an illustrative embodiment, the method 400 may be performed by one or more of the systems depicted in FIGS. 1-3. At 402, image data is received. For example, the image data may be received at a bad pixel detection module such as the module 110 of FIG. 1, 204 of FIG. 2, or 304 of FIG. 3. Moving to 404, a pixel P is set to a particular pixel in the image data. For example, the pixel P may indicate a pixel under test, and may be initialized to a lower-right corner of the image data, as a starting position to scan the image data for bad pixels and bad pixel clusters.

Continuing to 406, a first bad cluster test is run using a first group of surrounding pixels. The first bad cluster test may test whether the pixel P and an adjacent pixel form a bad cluster. For example, the first bad cluster test may be performed using the first group of surrounding pixels 226 depicted in FIG. 2. Proceeding to 408, a determination is made whether the first bad cluster test detected a bad cluster. When the first bad cluster test detects a bad cluster, at 408, values of the bad pixels that form the bad cluster are modified, at 426. For example the values of the bad pixels may be set to a largest value, smallest value, median value, mean value, or any other such determinable representative value based on the first group of surrounding pixels. As another example, the values of the bad pixels may be based on values of the first group of surrounding pixels and also based on one or more threshold values. The one or more threshold values may be predetermined or may be based on a color channel of the pixel P, an intensity value of the pixel P, or both.

When the first bad cluster test does not detect a bad cluster, at 408, a second bad cluster test is run using a second group of surrounding pixels, at 410. The second bad cluster test may test whether the pixel P and a diagonal pixel form a bad cluster. For example, the second bad cluster test may be performed using the second group of surrounding pixels 236 depicted in FIG. 2. Proceeding to 412, a determination is made whether the second bad cluster test detected a bad cluster. When the second bad cluster test detects a bad cluster, at 412, the values of the bad pixels that form the bad cluster are modified, at 426.

When the second bad cluster test does not detect a bad cluster, at 412, a third bad cluster test is run using a third group of surrounding pixels, at 414. The third bad cluster test may test whether the pixel P and another adjacent pixel form a bad cluster. For example, the third bad cluster test may be performed using the third group of surrounding pixels 246 depicted in FIG. 2. Proceeding to 416, a determination is made whether the third bad cluster test detected a bad cluster. When the third bad cluster test detects a bad cluster, at 416, the values of the bad pixels that form the bad cluster are modified, at 426.

When the third bad cluster test does not detect a bad cluster, at 416, a fourth bad cluster test is run using a fourth group of surrounding pixels, at 418. The fourth bad cluster test may test whether the pixel P and another diagonal pixel form a bad cluster. For example, the fourth bad cluster test may be performed using the fourth group of surrounding pixels 256 depicted in FIG. 2. Proceeding to 420, a determination is made whether the fourth bad cluster test detected a bad cluster. When the fourth bad cluster test detects a bad cluster, at 420, the values of the bad pixels that form the bad cluster are modified, at 426.

When the fourth bad cluster test does not detect a bad cluster, at 420, a single bad pixel test is run using a fifth group of surrounding pixels, at 422. The single bad pixel test may test whether the pixel P is a bad pixel. For example, the single bad pixel test may be performed using the extended group of surrounding pixels 266 depicted in FIG. 2. Proceeding to 424, a determination is made whether the single bad pixel test detected that the pixel P was a bad pixel. When the single bad pixel test detects a bad pixel, at 424, the value of the bad pixel (P) is modified, at 426.

After values of the pixels are modified, at 426, or when no bad pixels and no bad clusters have been detected, at 424, P is incremented to a next pixel to be tested, at 428, and processing returns to 406, where the first bad cluster test is run using a first group of surrounding pixels for the new pixel P.

As illustrated in FIG. 4, after any bad pixel clusters are detected for a particular pixel P, remaining bad cluster tests and the single bad pixel test are not performed for the pixel P. For example, referring to the patterns 220, 230, 240, 250, and 260 of FIG. 2, a correction of the test pixel to equal a minimum or maximum of the group of surrounding pixels may ensure that no other pattern will subsequently detect a bad pixel cluster using the corrected value(s).

In addition, as illustrated in FIG. 4, the single bad pixel test may be performed for a particular pixel P after the cluster tests have been performed and no bad cluster has been detected that includes the pixel P. Otherwise, in a particular embodiment, when a single bad pixel test is performed first and the pixel P is part of a bad cluster, the pixel P may be "corrected" to have a value corresponding to its closest-valued neighbor. The closest-valued neighbor would be the other bad pixel of the bad pixel cluster, resulting in the bad pixel cluster remaining a bad cluster.

Figure 5:
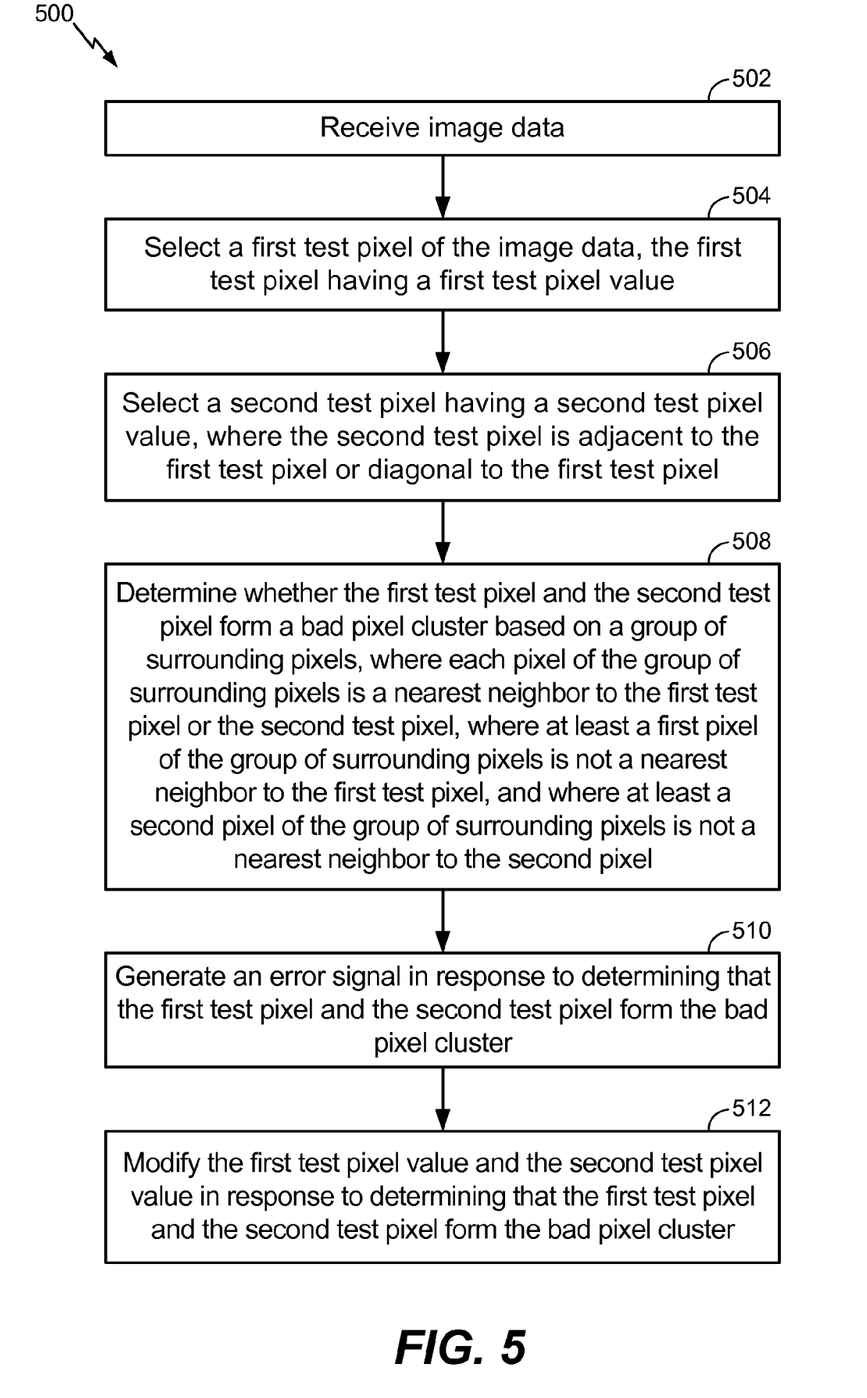
FIG. 5 is a flow chart of a second illustrative embodiment of a method of detecting bad pixel clusters.

FIG. 5 is a flow chart of a second illustrative embodiment of a method of detecting bad pixel clusters. In a particular embodiment, the method 500 may be performed by any of the systems depicted in FIGS. 1-3. At 502, image data is received. Moving to 504, a first test pixel of the image data is selected. The first test pixel has a first test pixel value. Advancing to 506, a second test pixel of the image data is selected. The second test pixel has a second test pixel value. The second test pixel is adjacent to the first test pixel or diagonal to the first test pixel.

Continuing to 508, a determination is made whether the first test pixel and the second test pixel form a bad pixel cluster based on a group of surrounding pixels, where each pixel of the group of surrounding pixels is a nearest neighbor to at least one of the first test pixel or the second test pixel, where at least a first pixel of the group of surrounding pixels is not a nearest neighbor to the first test pixel, and where at least a second pixel of the group of surrounding pixels is not a nearest neighbor to the second pixel. In a particular embodiment, at least two pixels of the group of surrounding pixels are not nearest neighbors to the first test pixel and at least two pixels of the group of surrounding pixels are not nearest neighbors to the second test pixel. For example, in the pattern 220 depicted in FIG. 2, three pixels 228 of the group of surrounding pixels 226 are not nearest neighbors to the first test pixel 222 and three pixels 229 of the group of surrounding pixels 226 are not nearest neighbors to the second test pixel 224.

In a particular embodiment, the second test pixel is adjacent to the first test pixel, and the group of surrounding pixels includes ten pixels that form a rectangular pattern around the first test pixel and the second test pixel. For example, in the pattern 220 depicted in FIG. 2, the second test pixel 224 is adjacent to the first test pixel 222, and the group of surrounding pixels 226 include ten pixels that form a rectangular pattern around the first test pixel 222 and the second test pixel 224.

In another particular embodiment, the second test pixel is diagonal to the first test pixel, and the group of surrounding pixels includes eight pixels that form an irregular hexagonal pattern around the first test pixel and the second test pixel. For example, in the pattern 230 depicted in FIG. 2, the second test pixel 234 is diagonal to the first test pixel 232, and the group of surrounding pixels 236 includes eight pixels that form an irregular hexagonal pattern around the first test pixel 232 and the second test pixel 234.

In a particular embodiment, determining whether the first test pixel and the second test pixel form the bad pixel cluster includes determining whether the first pixel value and the second pixel value exceed values of the group of surrounding pixels by more than a threshold amount. The threshold amount may be determined based on a color channel of the first test pixel and an intensity of the first test pixel. For example, the threshold amount may be stored in a lookup table such as the threshold value lookup table 206 of FIG. 2 or the lookup table 306 of FIG. 3. The first test pixel and the second test pixel may be determined to be a bad pixel cluster when the first test pixel value and the second test pixel value are greater than a greatest pixel value of the group of surrounding pixels by more than the threshold amount, or whether the first test pixel value and the second test pixel value are less than a smallest pixel value of the group of surrounding pixels by more than the threshold amount.

Proceeding to 510, in a particular embodiment, an error signal is generated in response to determining that the first test pixel and the second test pixel form the bad pixel cluster. Moving to 512, in a particular embodiment, the first test pixel value and the second test pixel value may be modified in response to determining that the first test pixel and the second test pixel form the bad pixel cluster.

In a particular embodiment, after the first test pixel is determined to not be part of the bad pixel cluster, further processing may be performed. For example, a determination may be made whether the first test pixel is a bad pixel based on pixel values of an extended group of pixels that is different from the group of surrounding pixels, such as the extended group of pixels 266 depicted in FIG. 2. The extended group of pixels may include at least two pixels that are not nearest neighbors to the first test pixel, such as pixels along the lines 271, 273, 275, and 277. By including non-nearest neighbor pixels in the extended group of pixels 266, features such as edges or lines present in the image data that include the first text pixel and that are oriented along one of the lines through nearest neighbor pixels 270, 272, 274, and 276, or that are oriented along the lines through non-nearest neighbor pixels 271, 273, 275, and 277, may be determined. For example, a bright line appearing in the image data that follows the line 275 may cause the first test pixel 262 to be considered a bad pixel when compared to its nearest neighbors as brighter than any nearest neighbor pixels. However, the non-nearest neighbor pixels in the extended group of pixels 266 along the line 275 will also be bright, thus preventing the first text pixel 262 from erroneously being classified as a bad pixel.

Figure 6:
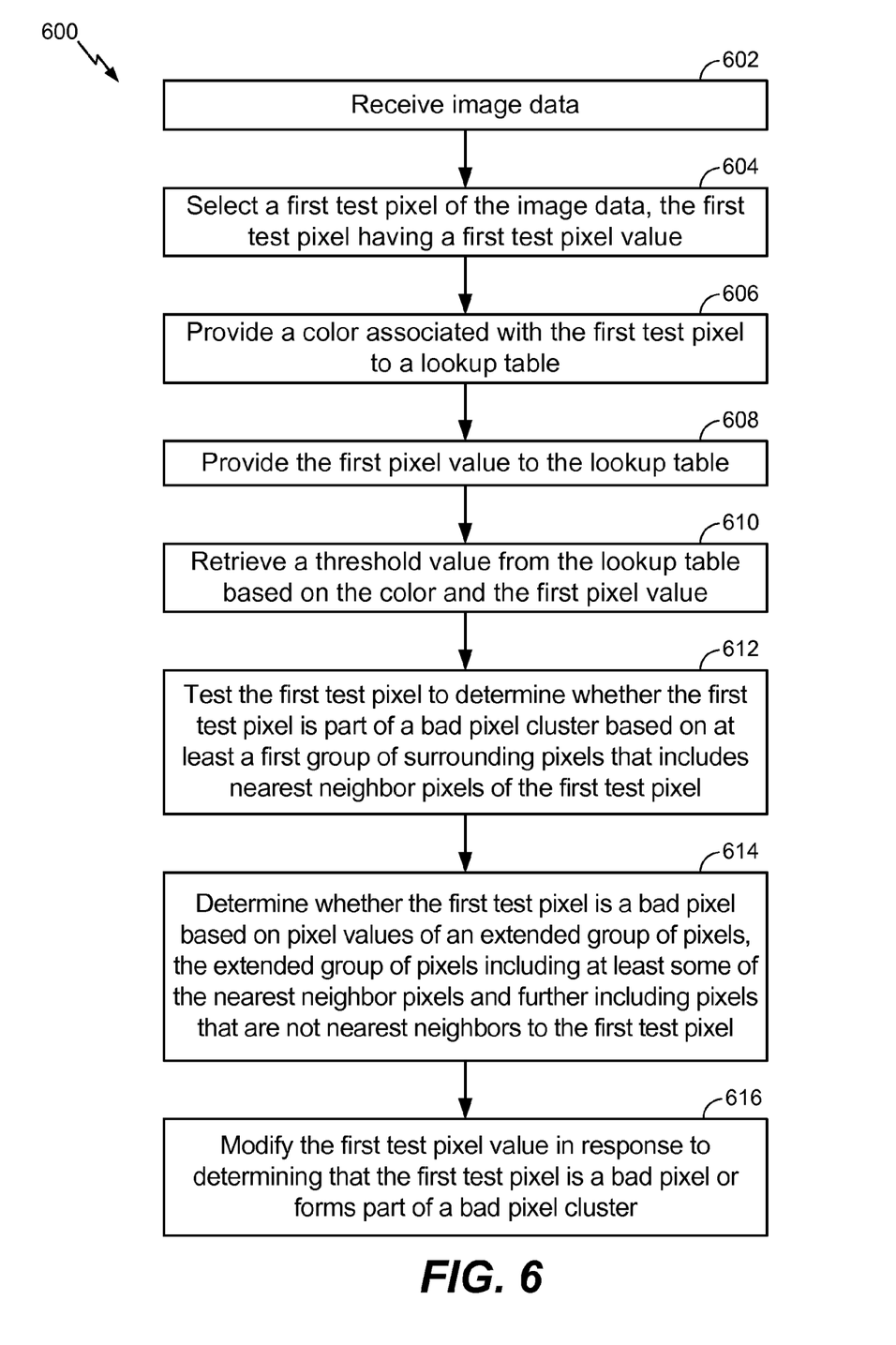
FIG. 6 is a flow chart of a third illustrative embodiment of a method of detecting bad pixel clusters.

FIG. 6 is a flow chart of a third illustrative embodiment of a method of detecting bad pixel clusters. In a particular embodiment, the method 600 may be performed by any of the systems depicted in FIGS. 1-3. At 602, image data is received.

Moving to 604, a first test pixel of the image data is selected. The first test pixel has a first test pixel value.

Proceeding to 606, in a particular embodiment, a color associated with the first test pixel is provided to a lookup table. Continuing to 608, the first pixel value may be provided to the lookup table. Moving to 610, a threshold value may be retrieved from the lookup table based on the color and based on the first pixel value. The threshold value may be used to compare the first test pixel value to a first group of surrounding pixels and to an extended group of pixels.

Advancing to 612, the first test pixel is tested to determine whether the first test pixel is part of a bad pixel cluster based on at least the first group of surrounding pixels that includes nearest neighbor pixels of the first test pixel. In a particular embodiment, the first test pixel is determined to form a bad pixel cluster with a second test pixel when values of the first test pixel and the second test pixel are outside a range of pixel values by more than the threshold value, where the range of pixel values is based on values of the surrounding group of pixels.

After the first test pixel is determined to not be part of the bad pixel cluster, a determination is made at 614 whether the first test pixel is a bad pixel based on pixel values of the extended group of pixels. The extended group of pixels includes at least some of the nearest neighbor pixels (i.e., at least some of the eight nearest pixels that are adjacent or diagonal to the first test pixel) and further includes pixels that are not nearest neighbors to the first test pixel (i.e., pixels that are not among the eight nearest pixels that are adjacent or diagonal to the first test pixel). For example, the extended group of pixels may include each pixel that is nearest to the first test pixel along eight substantially evenly spaced lines that intersect at the first test pixel, such as the extended group of pixels 266 depicted in FIG. 2.

At 616, the first test pixel value may be modified in response to determining that the first test pixel is a bad pixel or forms part of a bad cluster.

Figure 7:
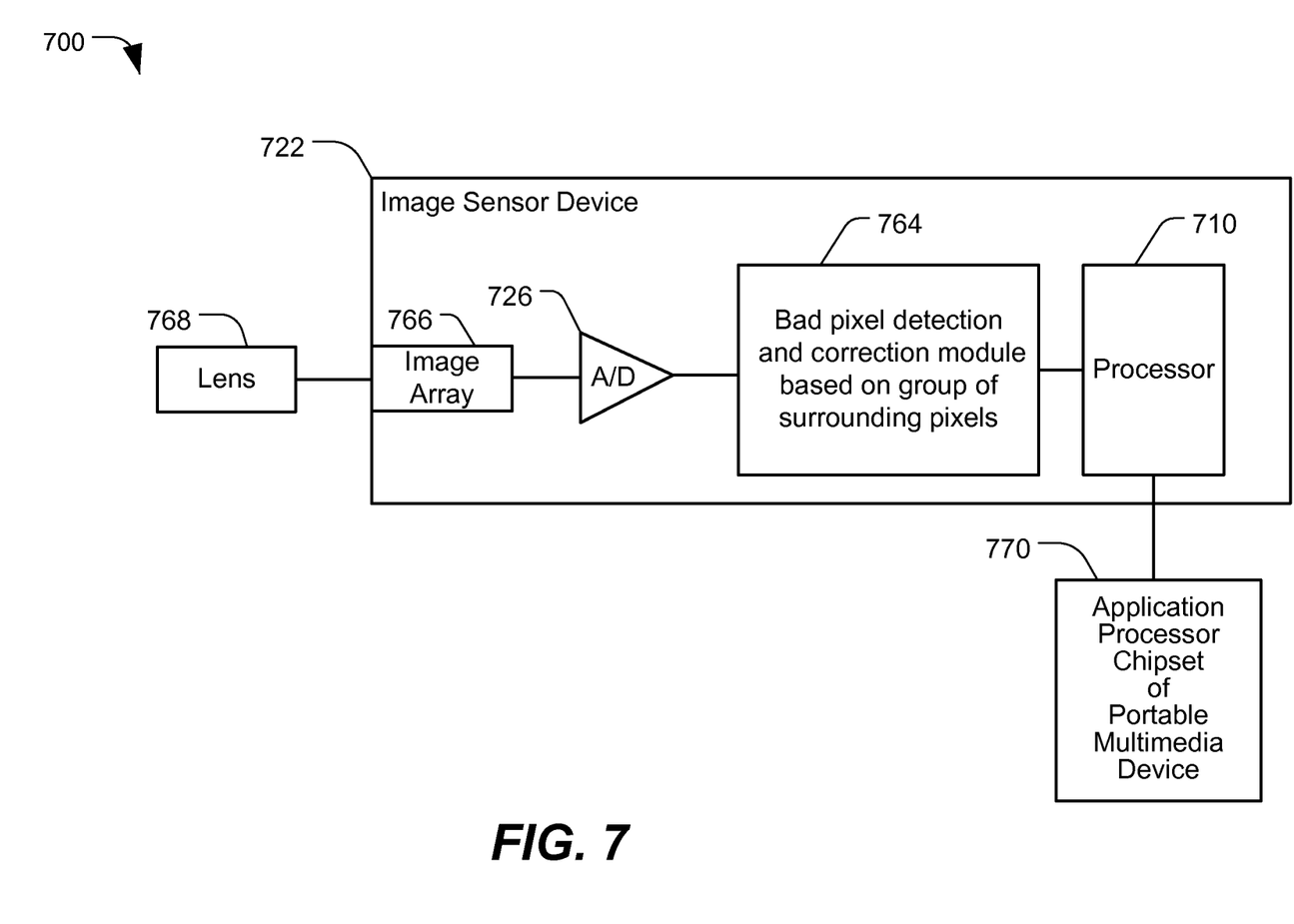
FIG. 7 is a block diagram of particular embodiment of a device including a bad pixel cluster detection module.

FIG. 7 is a block diagram of particular embodiment of a system including a bad pixel cluster detection and correction module. The system 700 includes an image sensor device 722 that is coupled to a lens 768 and also coupled to an application processor chipset of a portable multimedia device 770. The image sensor device 722 includes a bad pixel detection and correction module 764 to detect and to correct clusters and single bad pixels based on a group of surrounding pixels, such as by implementing one or more of the systems of FIGS. 1-3, by operating in accordance with any of the methods of FIGS. 4-6, or any combination thereof.

The bad pixel cluster detection and correction module 764 is coupled to receive image data from an image array 766, such as via an analog-to-digital convertor 726 that is coupled to receive an output of the image array 766 and to provide the image data to the bad pixel cluster detection and correction module 764.

The bad pixel cluster detection and correction module 764 is adapted to perform a bad pixel cluster detection process based on determining whether two test pixels have values that exceed values of a group of surrounding pixels by more than a threshold amount, where the threshold amount is determined via a table lookup. The table lookup may return a particular threshold amount at least partially based on a pixel color and a pixel value. In a particular embodiment, the group of surrounding pixels includes ten pixels that form a rectangular pattern around the two test pixels when the two test pixels are adjacent to each other, and the group of surrounding pixels includes eight pixels that form an irregular hexagonal pattern around the two test pixels when the two test pixels are diagonal to each other, such as in the patterns 220, 230, 240, and 250 depicted in FIG. 2.

The image sensor device 722 may also include a processor 710. In a particular embodiment, the processor 710 is configured to implement the bad pixel cluster correction module 764. In another embodiment, the bad pixel cluster detection and correction module 764 is implemented as image processing circuitry.

The processor 710 may also be configured to perform additional image processing operations, such as one or more of the operations performed by the modules 112-120 of FIG. 1. The processor 710 may provide processed image data to the application processor chipset 770 for further processing, transmission, storage, display, or any combination thereof.

Figure 8:
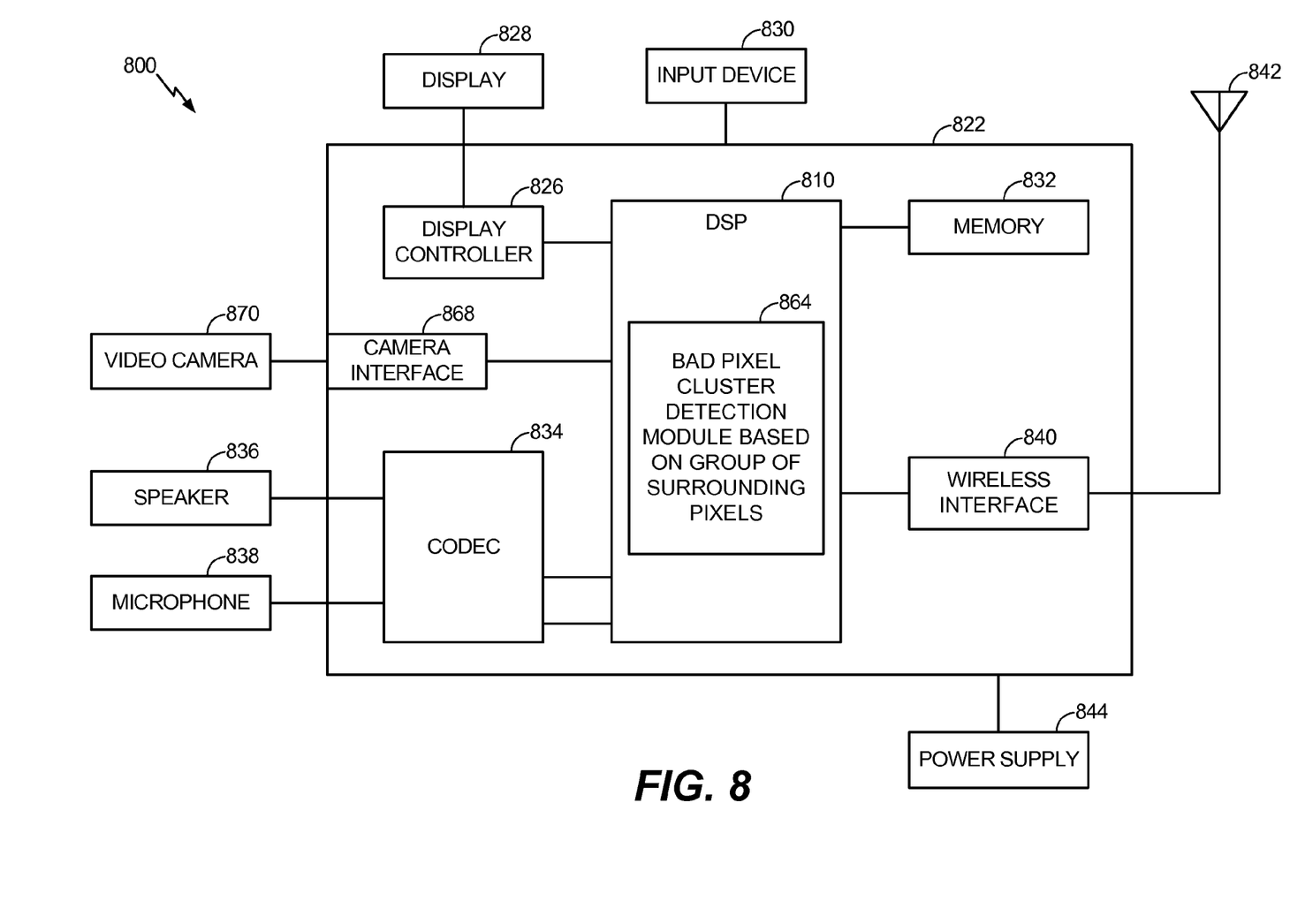
FIG. 8 is a block diagram of a portable communication device including a bad pixel cluster detection module.

FIG. 8 is a block diagram of particular embodiment of a system including a bad pixel cluster detection module. The system 800 may be implemented in a portable electronic device and includes a signal processor 810, such as a digital signal processor (DSP), coupled to a memory 832. The system 800 includes a bad pixel cluster detection module based on a group of surrounding pixels 864. In an illustrative example, the bad pixel cluster detection module based on a group of surrounding pixels 864 includes any of the systems of FIGS. 1-3, operates in accordance with any of the methods of FIGS. 4-6, or any combination thereof. The bad pixel cluster detection module based on a group of surrounding pixels 864 may be in the signal processor 810 or may be a separate device.

A camera interface 868 is coupled to the signal processor 810 and also coupled to a camera, such as a video camera 870. A display controller 826 is coupled to the signal processor 810 and to a display device 828. A coder/decoder (CODEC) 834 can also be coupled to the signal processor 810. A speaker 836 and a microphone 838 can be coupled to the CODEC 834. A wireless interface 840 can be coupled to the signal processor 810 and to a wireless antenna 842.

In a particular embodiment, the signal processor 810 includes the bad pixel cluster detection module based on a group of surrounding pixels 864 and is adapted to detect bad pixel clusters in image data by determining when a first test pixel and a second test pixel have values above an upper limit or below a lower limit, where the upper limit and the lower limit are determined based on pixel values of a group of at least eight pixels surrounding the first test pixel and the second test pixel.

The upper limit may be determined by adding a threshold value to a largest pixel value of the group of at least eight pixels, the lower limit may be determined by subtracting a threshold value from a smallest pixel value of the group of at least eight pixels. For example, the upper limit may be value determined as a sum of $V_{upper}$ and $T_{upper}$, as discussed with respect to FIG. 2, and the lower limit may be determined as $V_{lower}$ minus $T_{lower}$. The group of at least eight pixels may form a rectangular pattern around the first test pixel and the second test pixel when the first test pixel is adjacent to the second test pixel, such as illustrated in pattern 220 of FIG. 2. The signal processor 810 may be further configured to compare the first test pixel value to values of each pixel nearest to the first test pixel along sixteen evenly spaced directions radially outward from the first test pixel to determine whether the first test pixel is a bad pixel, such as discussed with respect to the extended group of pixels 266 depicted in FIG. 2.

The signal processor 810 may also be adapted to generate processed image data having corrected pixel values corresponding to detected bad pixels. The image data having bad pixel clusters may include video data from the video camera 870, image data from a wireless transmission via the wireless interface 840, or from other sources such as an external device coupled via a universal serial bus (USB) interface (not shown), as illustrative, non-limiting examples.

The display controller 826 is configured to receive the processed image data and to provide the processed image data to the display device 828. In addition, the memory 832 may be configured to receive and to store the processed image data, and the wireless interface 840 may be configured to receive the processed image data for transmission via the antenna 842.

In a particular embodiment, the signal processor 810, the display controller 826, the memory 832, the CODEC 834, the wireless interface 840, and the camera interface 868 are included in a system-in-package or system-on-chip device 822. In a particular embodiment, an input device 830 and a power supply 844 are coupled to the system-on-chip device 822. Moreover, in a particular embodiment, as illustrated in FIG. 8, the display device 828, the input device 830, the speaker 836, the microphone 838, the wireless antenna 842, the video camera 870, and the power supply 844 are external to the system-on-chip device 822. However, each of the display device 828, the input device 830, the speaker 836, the microphone 838, the wireless antenna 842, the video camera 870, and the power supply 844 can be coupled to a component of the system-on-chip device 822, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method for determining a bad pixel cluster using at least one processor, the method comprising:
    receiving image data;
    selecting a first test pixel of the image data, the first test pixel having a first test pixel value;
    selecting a second test pixel of the image data, the second test pixel having a second test pixel value, wherein the second test pixel is adjacent to the first test pixel or the second test pixel is diagonal to the first test pixel;
    providing a color associated with the first test pixel to a lookup table;
    providing the first test pixel value to the lookup table;
    retrieving a threshold value from the lookup table based on the color and based on the first test pixel value; and
    determining, by using the at least one processor, whether the first test pixel and the second test pixel form a bad pixel cluster based on a group of surrounding pixels, wherein the threshold value is used to compare the first test pixel value to the group of surrounding pixels, wherein each pixel of the group of surrounding pixels is a nearest neighbor to at least one of the first test pixel or the second test pixel, wherein at least a first pixel of the group of surrounding pixels is not a nearest neighbor to the first test pixel and wherein at least a second pixel of the group of surrounding pixels is not a nearest neighbor to the second test pixel.

2. The method of claim 1, wherein at least two pixels of the group of surrounding pixels are not nearest neighbors to the first test pixel and wherein at least two pixels of the group of surrounding pixels are not nearest neighbors to the second test pixel.

3. The method of claim 2, wherein three pixels of the group of surrounding pixels are not nearest neighbors to the first test pixel and wherein three pixels of the group of surrounding pixels are not nearest neighbors to the second test pixel.

4. The method of claim 3, wherein the second test pixel is adjacent to the first test pixel, and wherein the group of surrounding pixels includes ten pixels that form a rectangular pattern around the first test pixel and the second test pixel.

5. The method of claim 3, wherein the second test pixel is diagonal to the first test pixel, and wherein the group of surrounding pixels includes eight pixels that form an irregular hexagonal pattern around the first test pixel and the second test pixel.

6. The method of claim 1, further comprising, after the first test pixel is determined to not be part of the bad pixel cluster, determining whether the first test pixel is a bad pixel based on pixel values of an extended group of pixels that is different from the group of surrounding pixels, the extended group of pixels including at least two pixels that are not nearest neighbors to the first test pixel.

7. The method of claim 6, wherein determining whether the first test pixel and the second test pixel form the bad pixel cluster includes determining whether the first pixel value and the second pixel value exceed a representative value of the group of surrounding pixels by more than the threshold amount.

8. The method of claim 7, wherein determining whether the first test pixel and the second test pixel form the bad pixel cluster includes determining whether the first test pixel value and the second test pixel value are greater than a greatest pixel value of the group of surrounding pixels by more than the threshold amount, or whether the first test pixel value and the second test pixel value are less than a smallest pixel value of the group of surrounding pixels by more than the threshold amount.

9. The method of claim 1, further comprising:
generating an error signal in response to determining that the first test pixel and the second test pixel form the bad pixel cluster; and
modifying the first test pixel value and the second test pixel value.

10. A method for determining a bad pixel cluster using at least one processor, the method comprising:
receiving image data;
selecting a first test pixel of the image data;
calculating, by using the at least one processor, a first test pixel value for the first test pixel, wherein the first test pixel value corresponds to an intensity level of the pixel and is based at least in part on amount of light received at a corresponding detector cell, color channel, hue, saturation, and/or value data;
providing a color associated with the first test pixel to a lookup table;
providing the first pixel value to the lookup table;
retrieving a threshold value from the lookup table based on the color and based on the first pixel value;
testing the first test pixel to determine whether the first test pixel is part of a bad pixel cluster based on at least a first group of surrounding pixels that includes nearest neighbor pixels of the first test pixel, wherein the threshold value is used to compare the first test pixel value to the first group of surrounding pixels; and
after the first test pixel is determined to not be part of the bad pixel cluster based on at least the first group of surrounding pixels, determining whether the first test pixel is a bad pixel based on pixel values of an extended group of pixels, the extended group of pixels including at least some of the nearest neighbor pixels and further including pixels that are not nearest neighbors to the first test pixel, wherein the threshold value is used to compare the first test pixel value to the extended group of pixels.

11. The method of claim 10, wherein the extended group of pixels includes each pixel that is nearest to the first test pixel along eight substantially evenly spaced lines that intersect at the first test pixel.

12. The method of claim 10, wherein the first test pixel is determined to form a bad pixel cluster with a second test pixel when values of the first test pixel and the second test pixel are outside a range of pixel values by more than the threshold value, wherein the range of pixel values is based on values of the first group of surrounding pixels and to the extended group of pixels.

13. A system comprising:
a bad pixel detection module configured to receive image data and to perform a bad pixel cluster detection process, the bad pixel detection module including logic to determine whether two test pixels have values that exceed a representative value of a group of surrounding pixels by more than a threshold amount, wherein the threshold amount is determined via a table lookup comprising:
providing a color associated with a first pixel of the two test pixels to a lookup table;
providing a value associated with the first pixel to the lookup table;
retrieving a threshold value from the lookup table based at least partly on the color of the first pixel and the value of the first pixel; and
testing the first test pixel to determine whether the first test pixel is part of a bad pixel cluster based on at least the group of surrounding pixels, the group of surrounding pixels including nearest neighbor pixels of the first test pixel, wherein the threshold value is used to compare the first test pixel value to the first group of surrounding pixels.

14. The system of claim 13, wherein the group of surrounding pixels includes ten pixels that form a rectangular pattern around the two test pixels when the two test pixels are adjacent to each other, and wherein the group of surrounding pixels includes eight pixels that form an irregular hexagonal pattern around the two test pixels when the two test pixels are diagonal to each other.

15. The system of claim 13, wherein the bad pixel detection module is within an image sensor device, the image sensor device including an analog-to-digital converter coupled to receive an output of an image array and to provide the image data to the bad pixel detection module.

16. The system of claim 13, further comprising a processor including instructions that are executable to implement the bad pixel detection module.

17. The system of claim 13, wherein the bad pixel detection module is implemented as image processing circuitry.

18. A system comprising:
a signal processor adapted to detect bad pixel clusters in image data by determining when a first test pixel and a second test pixel have values above an upper limit or below a lower limit, wherein the upper limit and the lower limit are determined based on by providing a color associated with the first test pixel to a lookup table and retrieving the upper limit and the lower limit from the lookup table based on the color; wherein the upper limit and the lower limit are used to compare the values of the first test pixel and the second test pixel to pixel values of a group of at least eight pixels surrounding the first test pixel and the second test pixel, the signal processor further adapted to generate processed image data having modified pixel values corresponding to the detected bad pixel clusters; and
a display controller coupled to receive the processed image data and to provide the processed image data to a display device.

19. The system of claim 18, wherein the upper limit is determined by adding a threshold value to a largest pixel value of the group of at least eight pixels, and wherein the lower limit is determined by subtracting the threshold value from a smallest pixel value of the group of at least eight pixels.

20. The system of claim 19, wherein the group of at least eight pixels forms a rectangular pattern around the first test pixel and the second test pixel when the first test pixel is adjacent to the second test pixel.

21. The system of claim 18, wherein the signal processor is further configured to compare the first test pixel value to values of each pixel nearest to the first test pixel along sixteen evenly spaced directions radially outward from the first test pixel to determine whether the first test pixel is a bad pixel.

22. The system of claim 18, further comprising a camera interface coupled to the signal processor and configured to be coupled to a video camera, wherein the image data includes video data received via the camera interface.

23. The system of claim 18, further comprising a wireless interface coupled to the signal processor and configured to be coupled to an antenna to enable wireless communication, wherein the image data is received via the wireless interface.

24. An electronic system for determining a bad pixel cluster using at least one processor, comprising:
- means for detecting bad pixel clusters in image data by determining when a first test pixel and a second test pixel have values above an upper limit or below a lower limit, wherein the upper limit and the lower limit are determined based on by providing a color associated with the first test pixel to a lookup table and retrieving the upper limit and the lower limit from the lookup table based on the color;
- means for using the upper limit and the lower limit to compare the values of the first test pixel and the second test pixel to pixel values of a group of at least eight pixels surrounding the first test pixel and the second test pixel;
- means for generating processed image data having modified pixel values corresponding to the detected bad pixel clusters; and
- means for receiving the processed image data and providing the processed image data to a display device.

25. The electronic system of claim 24, wherein the means for detecting bad pixel clusters comprises a signal processor.

26. The electronic system of claim 24, wherein the means for receiving the processed image data comprises a display controller.

27. A non-transitory computer readable medium comprising instructions that when executed by a processor perform a method comprising:
- detecting bad pixel clusters in image data by determining when a first test pixel and a second test pixel have values above an upper limit or below a lower limit, wherein the upper limit and the lower limit are determined based on by providing a color associated with the first test pixel to a lookup table and retrieving the upper limit and the lower limit from the lookup table based on the color;
- using the upper limit and the lower limit to compare the values of the first test pixel and the second test pixel to pixel values of a group of at least eight pixels surrounding the first test pixel and the second test pixel;
- generating processed image data having modified pixel values corresponding to the detected bad pixel clusters; and
- receiving the processed image data and providing the processed image data to a display device.

28. A non-transitory computer readable medium comprising instructions that when executed by a processor perform a method comprising:
- receiving image data;
- determining whether two test pixels have values that exceed a representative value of a group of surrounding pixels by more than a threshold amount, wherein the threshold amount is determined via a table lookup comprising a method of:
  - providing a color associated with a first pixel of the two test pixels to a lookup table;
  - providing a value associated with the first pixel to the lookup table;
  - retrieving a threshold value from the lookup table based at least partly on the color of the first pixel and the value of the first pixel; and
  - testing the first test pixel to determine whether the first test pixel is part of a bad pixel cluster based on at least the group of surrounding pixels, the group of surrounding pixels including nearest neighbor pixels of the first test pixel, wherein the threshold value is used to compare the first test pixel value to the first group of surrounding pixels.

29. The non-transitory computer readable medium of claim 28, wherein the group of surrounding pixels includes ten pixels that form a rectangular pattern around the two test pixels when the two test pixels are adjacent to each other, and wherein the group of surrounding pixels includes eight pixels that form an irregular hexagonal pattern around the two test pixels when the two test pixels are diagonal to each other.

30. The non-transitory computer readable medium of claim 28, wherein the processor is implemented in an image sensor device, the image sensor device including an analog-to-digital converter coupled to receive an output of an image array and to provide the image data to the processor.

* * * * *